United States Patent [19]

Florindez

[11] Patent Number: 4,945,825
[45] Date of Patent: Aug. 7, 1990

[54] INDEXING MACHINE FOR BAKING PANS

[76] Inventor: Augusto Florindez, 13029 Ocaso, La Mirada, Calif. 90638

[21] Appl. No.: 356,118

[22] Filed: May 24, 1989

[51] Int. Cl.$^5$ .................... A47J 27/00; B65B 35/46; B65G 47/29
[52] U.S. Cl. .................... 99/353; 99/427; 99/443 C; 53/251; 53/534; 198/431
[58] Field of Search .............. 99/352, 353, 334, 426, 99/427, 440, 443 C; 198/418.6, 431, 465.1; 53/246, 251, 534, 539

[56] References Cited

U.S. PATENT DOCUMENTS

| | | | |
|---|---|---|---|
| 3,225,513 | 12/1965 | Ehe | 198/431 |
| 3,662,676 | 5/1972 | Hartz | 99/443 C |
| 4,535,687 | 8/1985 | Antpohler | 99/334 |
| 4,693,055 | 9/1987 | Olsen, Jr. et al. | 53/251 |

FOREIGN PATENT DOCUMENTS

| | | | |
|---|---|---|---|
| 8000559 | 4/1980 | PCT Int'l Appl. | 198/465.1 |
| 255553 | 7/1926 | United Kingdom | 99/443 C |

*Primary Examiner*—Philip R. Coe
*Assistant Examiner*—M. Spisich

*Attorney, Agent, or Firm*—Plante, Strauss, Vanderburgh & Connors

[57] ABSTRACT

Disclosed is a machine for moving bakery pans in a stepwise fashion to enable rows of cups in the pans to be filled with dough packets. The rows of cups are spaced apart a predetermined distance which will vary depending upon the type of bakery product being made. The pans are carried by a converter and an indexing device is used to prevent these pans from being moved by the conveyor until individual rows of cups are filled with dough packets. The indexing device includes a helical arm mounted on a shaft which is removably coupled to an indexing motor that revolves the shaft through a 360° turn and then momentarily stops to enable the cups to be filled with dough packets. The flights of the arm are spaced apart a distance corresponding to the spacing between rows of cups, with each flight having an edge which will engage a raised lip along the perimeter of the pan. The edge of the flight bearing against the lip of the pan prevents the pan from moving until the arm is rotated. Then the pan will move only the incremental distance corresponding to the distance between flights.

8 Claims, 4 Drawing Sheets

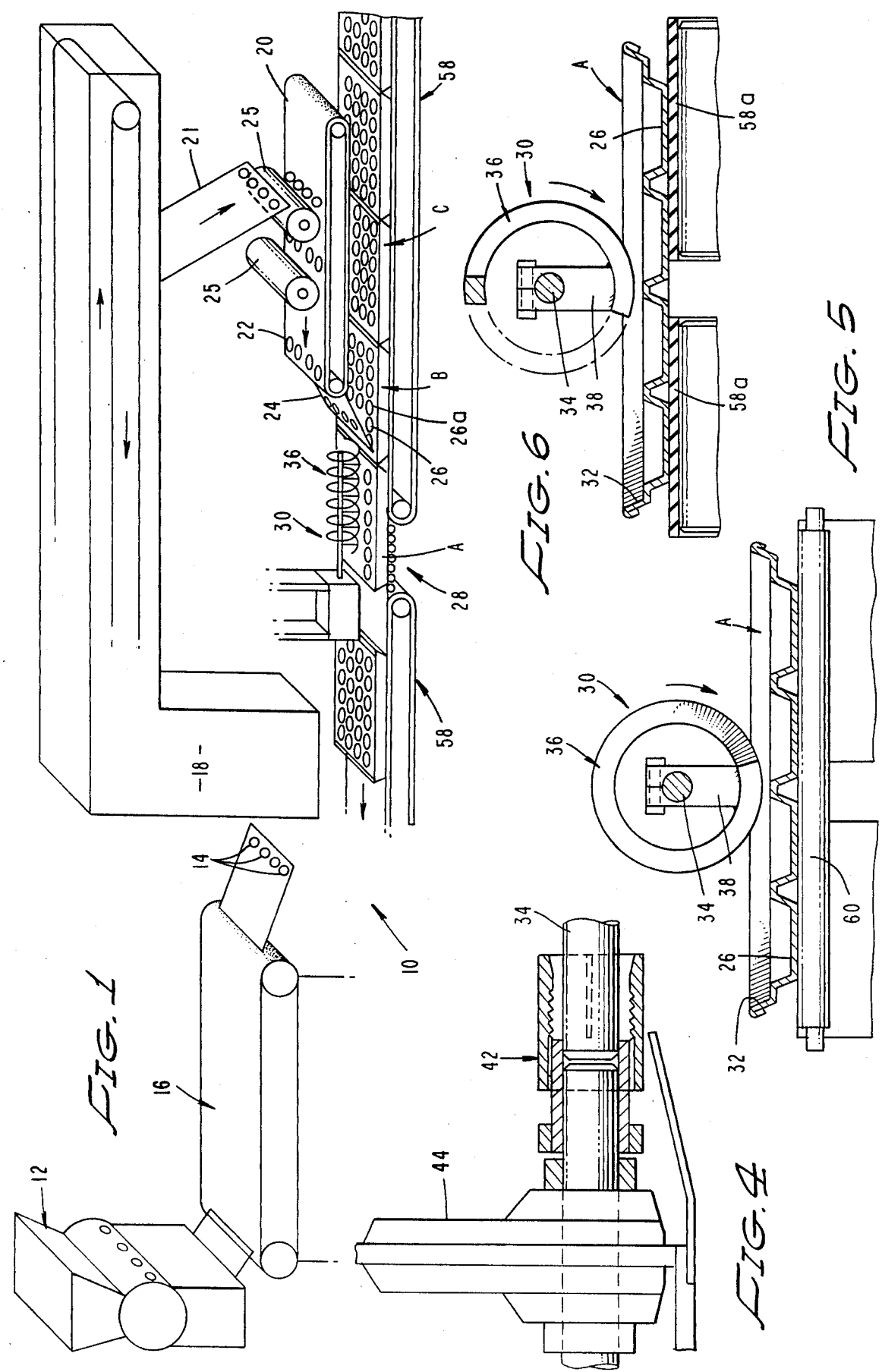

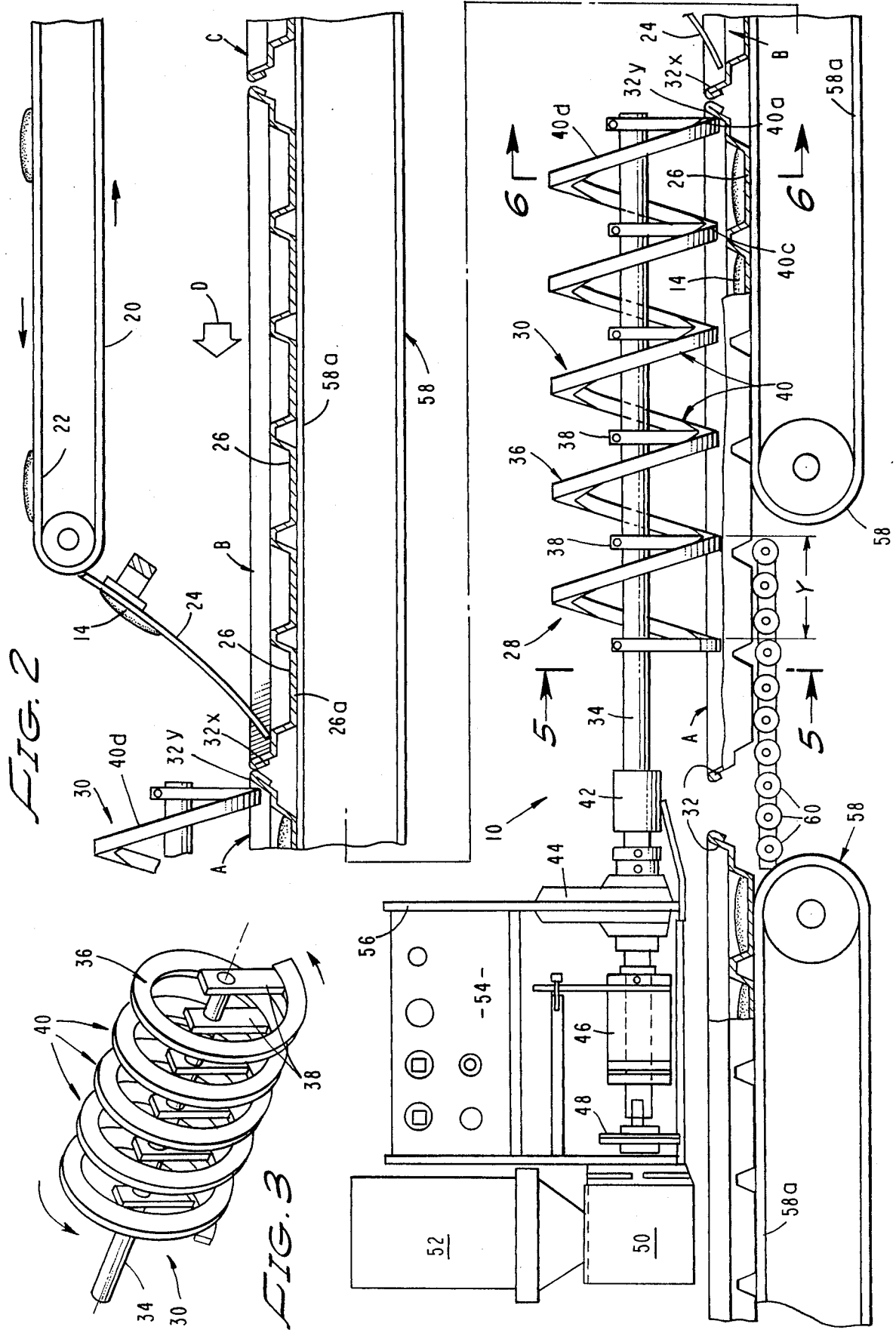

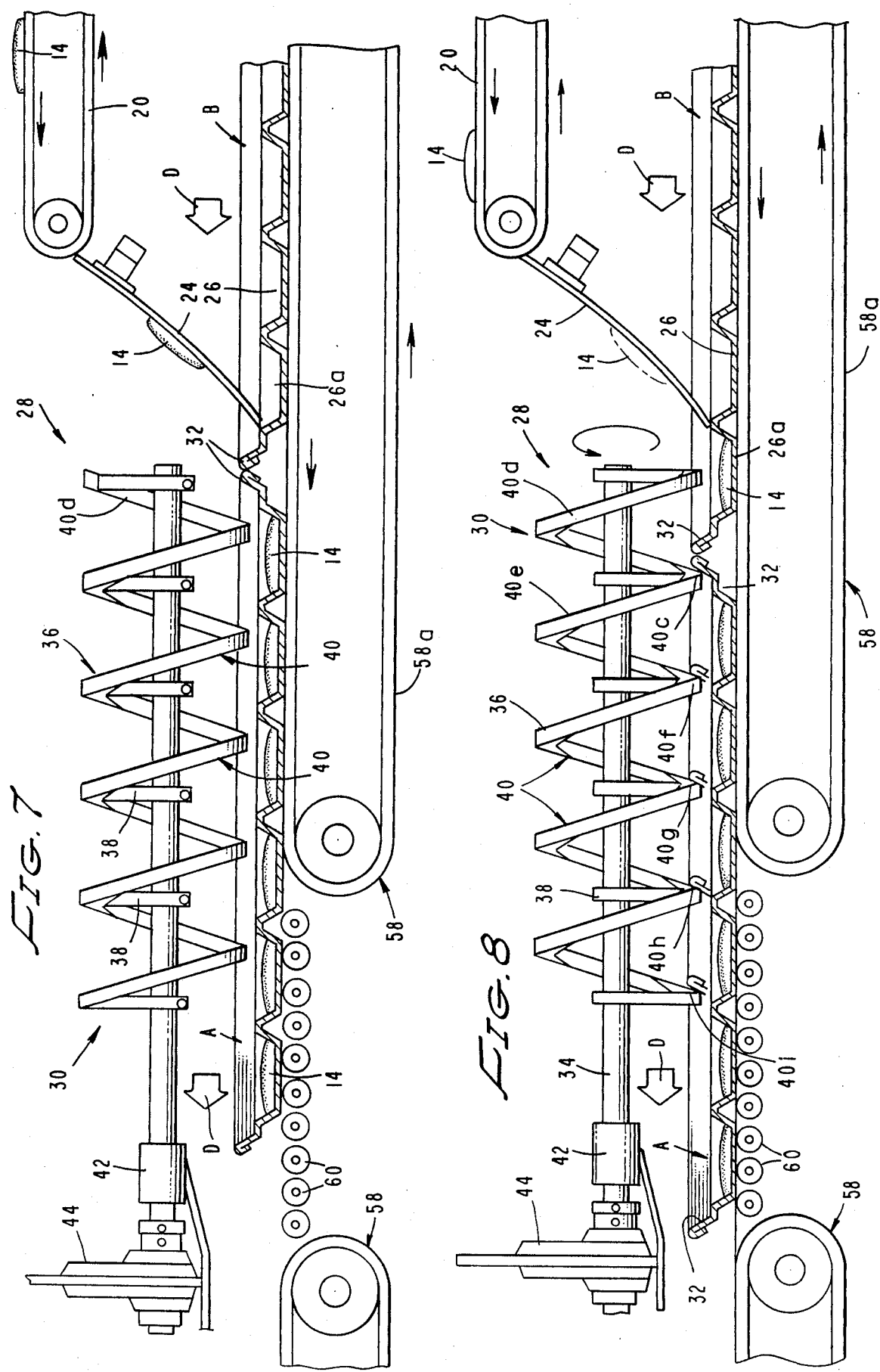

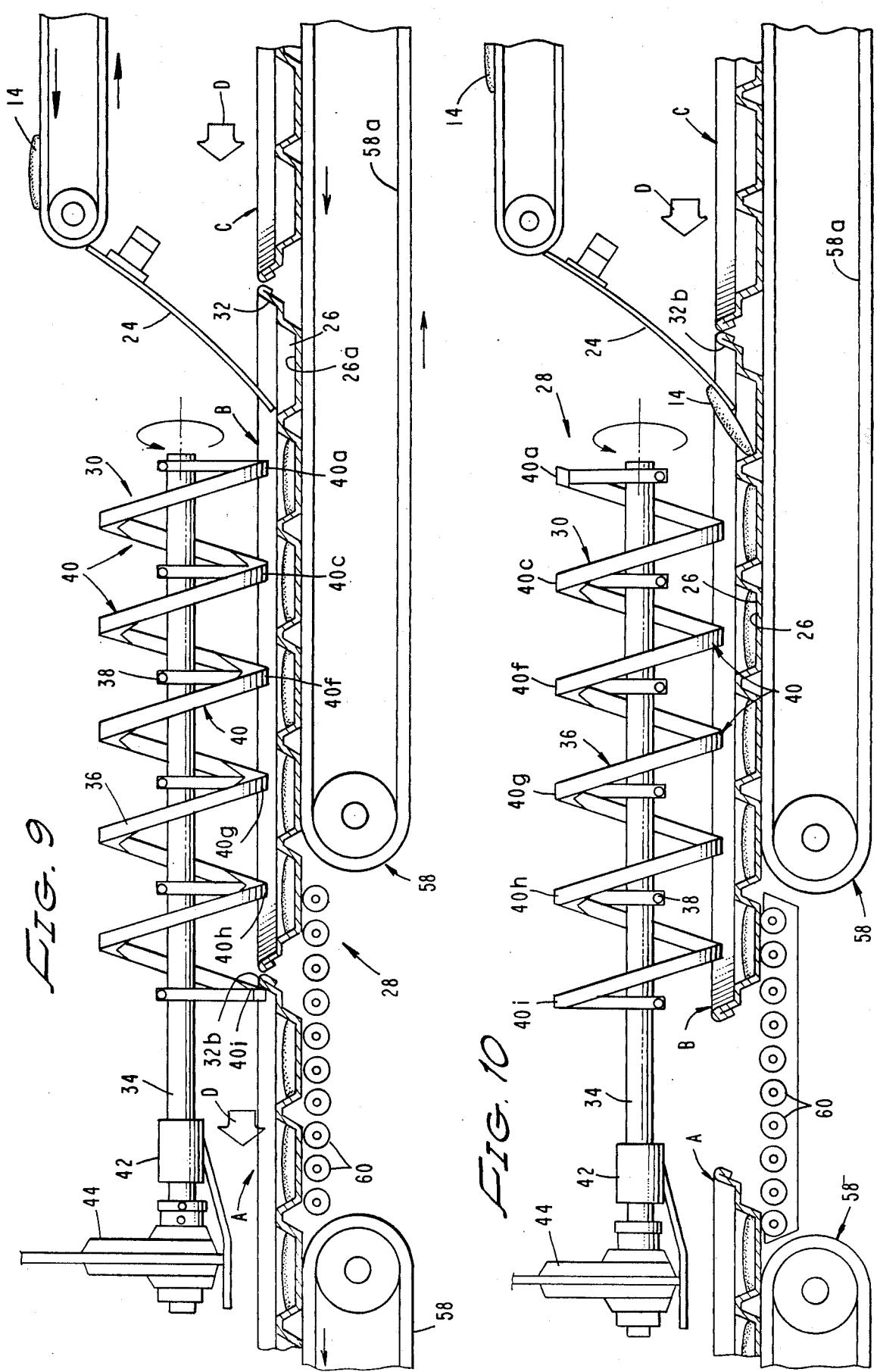

INDEXING MACHINE FOR BAKING PANS

BACKGROUND OF THE INVENTION

1. Field of the Invention

This invention relates to a machine for moving baking pans in a step-wise fashion as dough packets are deposited within the cup or cups of a pan. This machine is adapted to function with different size baking pans used make different baking products.

2. Background Discussion

In the baking industry, it is common practice to utilize baking pans to make such products as hot dog buns, hamburger buns, bread loaves, and other bakery products. Baking pans are generally of a rectangular configuration and include rows of cups which hold dough packets. In the case of bread loaves, the pan only has one large cup. Dough packets are moved by conveyors and deposited in the baking pans automatically, row by row. As this is done, the pans are moved in a step-wise fashion along a predetermined path past the means for moving the dough packets to a point where they can be deposited in the pan. In other words, each cup of the pan has a dough packet placed in it, with the dough packets being deposited one row at a time in the baking pan, or with bread loaves one pan at a time being filled with a single large mass of dough.

Since different bakery products are made, different sized baking pans are utilized. Each of these pans will have a different specific construction, although in general, each pan has a raised lip about the perimeter of the pan. The cups will be shaped differently depending on the type of product being made. For example, the cup will be oblong or elliptical when a hot dog bun is being made, and generally circular when a hamburger bun is being made. The rows of cups for hamburger buns will have different spacing than the rows of cups for hot dog buns. As a consequence, the interval in which the pans are moved will differ depending upon the bakery product being made.

SUMMARY OF THE INVENTION

The present invention is an indexing machine for bakery pans and is particularly adapted to move the pans a precise interval with each cycle of the production equipment. When different types of products are to be made, the machine is easily adapted to change the length of the step or interval that the pan is moved so that it coincides with the type of product being made.

There are several features of this invention, no single one of which is solely responsible for its desirable attributes. Without limiting the scope of this invention as expressed by the claims, its more prominent features will now be discussed briefly. After considering this discussion, and particularly after reading the section of this application entitled "DETAILED DESCRIPTION OF THE PREFERRED EMBODIMENT," one will understand how the features of this invention provide its advantages.

One feature of the present invention is the use of an arm in the form of a helix. This arm is mounted on a shaft which is rotated through one 360° turn and then stopped momentarily. The helical arm includes a series of flights, with the spacing between individual flights corresponding to the incremental distance or interval that the pan is moved. This interval corresponds to the spacing between the rows of cups in the pan, or with a single cup pan, the pan width. When a single cup pan is used, the helical arm has only a single flight. The flights engage the raised lip along the perimeter of the pan and serve to bear against this lip, preventing the pan from being moved by a conveyor on which the pan sets. When the arm is rotated, the conveyor then pushes the lip of the pan against the flight bearing against the lip, allowing the pan to move only the distance between individual flights.

The second feature of this invention is that the shaft to which the helical arm is attached is releasable or removably connected to a drive motor which rotates the arm. A plurality of different arms are used which have different spacing between the flights to correspond to the different types of bakery pans used. Thus, when it is time to change over to a new production run, the arm in use is replaced with another arm. For example, switching from the manufacture of hamburger buns, which uses an arm having a plurality of flights spaced apart a distance equal to the spacing between rows of cups in the hamburger pans, to the manufacture of bread loaves, which uses an arm having only a single flight with a width about equal to the width of the single cup bread pan. To change over from making hamburger buns to loaves of bread, the multiple flight arm is removed from the machine and replaced with the single flight arm. Thus, it is easy to modify the machine to handle essentially any size bakery pans.

The third feature of this invention is that the helical arm is either made of plastic or has a plastic coating on its exterior which minimizes the frictional forces between the lip of the bakery pan and the surface of the flights of the arm. Thus there is likelihood that the arm will bind against the lip of the pan.

The preferred embodiment of this invention illustrating all its features will now be discussed in detail in connection with the accompanying drawing.

BRIEF DESCRIPTION OF THE DRAWING

The machine of this invention is shown in the drawing, which is for illustrative purposes only and wherein like numerals indicate like parts, and in which:

FIG. 1 is is a simplified perspective view of the machine of this invention installed in a bakery assembly line making hamburger buns.

FIG. 2 is a side elevational view, with sections broken away, of the machine of this invention in the assembly line depicted in FIG. 1, showing dough packets being fed to pans moved by a conveyor along the line.

FIG. 3 is a perspective view of the helical arm used with the machine of this invention.

FIG. 4 is an enlarged side elevational view, with sections broken away, showing the coupling for releasably connecting the arm shown in FIG. 3 to its drive motor.

FIG. 5 is a cross-sectional view taken along line 5—5 of FIG. 2.

FIG. 6 is a cross-sectional view taken along line 6—6 of FIG. 2.

FIG. 7 is a side elevational view similar to that shown in FIG. 2 illustrating the commencement of the helical arm rotating as the dough packet drops into a pan.

FIG. 8 is a side elevational view similar to that shown in FIG. 2 illustrating the arm rotating through the 360° turn.

FIG. 9 is a side elevational view similar to that shown in FIG. 8 showing the relative positions of adjacent pans, with a filled pan ready to disengage from the helical arm upon the commencement of the next rotation of the arm.

FIG. 10 is a side elevational view similar to that shown in FIG. 9 showing the relative positions of adjacent pans after the helical arm has been rotated through about 180° turn from the position shown in FIG. 9.

DETAILED DESCRIPTION OF THE PREFERRED EMBODIMENT

As shown in FIG. 1, apparatus 10 for manufacturing bakery products is depicted as including a dough hopper 12 which includes a mass of dough which is cut up into individual dough packets 14 and deposited on a conveyor 16 that serves to round the packets into individual balls which are then deposited into a carousel type conveyor 18, including individual retainer elements (not shown) arranged in rows that bring the dough packets to a point above an intermediate conveyor 20. The dough packets 14 exit the carousel conveyor 18 and slide down a ramp 21 onto the intermediate conveyor 20 and then pass beneath drums 25 which flatten the packets. This portion of the apparatus 10 is standard within the industry and, therefore, need not be described in detail.

The individual dough packets 14 are deposited more or less in rows 22 on the top of the conveyor 20 and forwarded to a bakery pan A that is moving in a stepwise fashion along a predetermined, common, generally horizontal path indicated by the arrow D. The packets 14 slide off the conveyor 20 along a ramp 24 into the individual cups 26 of the bakery pan A. The ramp 24 is flexible to allow it to move upwardly as the pans engage it. In addition to pan A, bakery pans B and C are shown along the common path D. The leading edge of an adjacent upstream pan, for example edge 32x of pan B, abuts the trailing edge, for example edge 32y of pan A, of an adjacent downstream pan. Pans A, B, and C are identical.

As best shown in FIGS. 1 and 2, the bakery pan A includes a series of rows 26a of cups 26 which, in the embodiment illustrated, are generally circular and are used to make hamburger buns. The individual rows 26a of cups 26 are spaced apart a predetermined distance, for example, ½ and ¾ inch. The dough packets 14 are spaced apart to correspond with the spacing between the cups 26 in an individual row 26a. Thus, as they fall from the surface of the ramp 24 they land in the cups 26, provided the cups are properly positioned beneath the ramp 24. The whole apparatus 10 is designed, and the stepwise movement of the pans A, B, and C is synchronized, so that the number of individual packets 14, spacing between individual packets in a row 22, and the rows 22 of packets leaving the conveyor 20 is coordinated to fill the rows 26a of cups 26 with dough packets as the pans advance stepwise along path D.

The machine 28 of this invention includes indexing means 30 to control the step-wise movement of the bakery pans A, B, and C. This indexing means 30 coacts with a raised lip 32 surrounding or encompassing the cups 26 within the baking pans A, B, and C. This lip 32 is generally along the perimeter of each of the pans. As best shown in FIG. 3, the indexing means 30 includes a drive shaft 34 which has mounted to it a helical arm 36. This arm 36 is made of a plastic strip which is wound about in a spiral or helical fashion and connected to the shaft 34 by support members 38. The support members 38 extend from the shaft 34 to the perimeter of alternate flights 40 in the arm 36. As depicted in FIG. 2, the distance Y between adjacent flights 40 equals the distance between adjacent rows 26a of the cups 26. The pans A, B, and C are advanced along the path D in steps equal to the distance Y.

As shown in FIGS. 2, 5, and 6, the flights 40 terminate within the bakery pan A and are of a sufficient length so that the edge 40a of the flight 40d abuts the raised lip 32. The arm 36 is preferably made of a plastic so that when the arm rotates and the flights 40 and lip 32 rub against each other, there is no binding. The shaft 34 is connected through a quick disconnect coupling 42, bearing 44, single-position clutch 46, safety clutch 48, and gear box 50 to a DC motor 52. A control unit 54, including control electronics (not shown), is mounted to a frame 56 which holds the motor 52, gear box 50, clutches 46 and 48, and bearing 44. Tabletop conveyors 58, such as sold under the trade name Pan-O-Mat, are employed to move the pans A, B, and C along their predetermined, horizontal path of travel. These conveyors 58 include endless belts 58a on which the bottoms of the cups 26 rest. A series of rollers 60 carry the pans A, B, and C between adjacent conveyors 58.

OPERATION

The apparatus 10 of this invention operates very simply. The bakery pans A, B, and C are aligned end to end in a row and are moved horizontally along their predetermined path D by the tabletop conveyors 58. The indexing means 30, however, holds an individual pan in place until the shaft 34 is rotated. Only as the shaft 34 rotates are the pans A, B, and C allowed to move. The edge 40a of the flight 40d engages the raised lip 32, holding the pan A in position. The trailing pan B is stacked up behind the pan B and held in a stationary position. The tabletop conveyor 58 nevertheless continues to move, with its belts 58a slipping underneath the bottom of the cups 26 of the pans. The indexing means 30 are coupled either mechanically or electronically by means not shown to the conveyor 20 for the dough packets 14 so that, as a row 22 of dough packets are deposited into a row 26a of cups immediately beneath conveyor 20, the shaft 34 is rotated through a 360° turn.

As depicted in FIG. 7, when the shaft 34 rotates, the flight 40d engaging the lip 32 moves away from the lip, allowing the tabletop conveyor 58 to push or advance the pan A to the left as viewed in FIG. 7. As depicted in FIG. 8, when the shaft 34 stops rotating, the edge 40c of the flight 40e now engages the lip 32 and the pan B has been advanced to a position where its first row 26a of cups 26 are immediately beneath the ramp 24. With each individual 360° turn of the shaft, the pans A, B, and C advance one row 26a of cups in a stepwise fashion to position the advanced row beneath the ramp 24, and the lip 32 of pan A engages successive edges 40f, 40g, 40h, and 40i of the flights 40 with each turn of the shaft. As shown in FIG. 9, when the trailing lip 32b of pan A engages the edge 40i of the proximal flight 40, all the cups 26 of the pan B are filled except the last row 26b which is positioned beneath the ramp 24. As shown in FIG. 10, when the shaft 34 again rotates through a 360° turn, the pan B advances to the left and moves into the same position as pan A previously occupied as shown in FIG. 2.

This synchronous operation of the indexing means 30 with the dough packet conveyor 20 produces a semi-continuous flow, so that the individual rows 26a of cups 26 in any pan beneath the conveyor 20 are filled with dough packets 14 and then advanced one row at a time by the indexing means. Any suitable means may provide a signal to actuate the rotation of the shaft 34, allowing for a momentary stopping of the advancement of the pans to allow the cups to be filled with dough packets 14. For example, a electronic eye type of switch could be activated by the dough packets moving down the ramp 24. The operation of the indexing means 30 continues for the entire production run for whatever particular type of bakery product is being made.

When it is time to change over to a production run for a different type of bakery product, the type of pans employed are different to accommodate the new production run. In this case the spacing between the rows of cups will be different. Consequently, the arm 36 is replaced with an arm suitable for the new production run. In accordance with this invention, the quick disconnect coupling 42 is released and the shaft 34 is manually pulled from the coupling and a new arm is placed in position with flights having a distance between tips of the flights equal to the distance between rows of cups for the new product being made. This is a simple, easy to perform operation. Any number of arms with different spacing between flights can be employed to accommodate the wide variety of baking pans being used in the baking industry. For example, if bread loaves were to be manufactured instead of hamburger buns, the arm 36 would be removed simply by loosening the coupling 42 and withdrawing it from the coupling. A new arm, in this case with only one flight since a bread pan does not have a plurality of cups, is then inserted into the coupling 42 and the coupling tightened. There needs to be no change in the gear box for the motor, and the same single position clutch can be used. The only modification or change required is that one arm must be replaced with a new arm corresponding to the product being made. The motor 52 can be equipped with a suitable speed control on the control unit 54 so that the rate at which the arm rotates can be regulated to match it with the speed at which dough packets 14 are being forwarded to the bakery pans. Moreover, the vertical position of the indexing means 30 may be adjusted to raise or lower it to accommodate the type of pan being used, so that the flights engage the raised lip 32 of the pan.

SCOPE OF THE INVENTION

The above description presents the best mode contemplated of carrying out the present invention. This invention, however, is susceptible to modifications and alternate constructions from the embodiment shown in the drawing and described above. Consequently, it is not the intention to limit the invention to the particular embodiment disclosed. On the contrary, the intention is to cover all modifications and alternate constructions coming within the spirit and scope of the invention as generally expressed by the following claims.

I claim:

1. A machine for manufacturing bakery products, including
    means for depositing individual dough packets into cups of a bakery pan having a raised lip extending about the perimeter of the pan, said cups being arranged in rows which are spaced apart a predetermined distance, said dough packets being deposited row by row as the pan is advanced incrementally along a predetermined path,
    means for advancing the pans along said path, said pans being arranged in series and aligned so that adjacent pans abut each other, said advancing means including indexing means comprising an arm in the form of a helical member having a plurality of flights which are spaced apart a distance corresponding to the distance between the rows of cups, said flights being positioned so that an edge of a flight engages the lip of the pan as it moves along said path,
    motor means for turning said arm so that it rotates through one 360° turn and then stops momentarily, and
    means for removably coupling the arm to the motor means so that the arm may be disconnected and replaced with another arm which has flights with different spacings that accommodate different size pans.

2. The apparatus of claim 1 wherein the arm is mounted on a shaft with said shaft being coupled to the means for removably coupling the arm to the motor means.

3. The apparatus of claim 2 wherein the arm has an exterior made of plastic that reduces the likelihood of the surface of the arm binding to the lip of the pan.

4. An indexing machine for bakery pans comprising
    means for advancing the pans along a predetermined path, said pans having a raised lip and rows of cups which are spaced apart a predetermined distance,
    an arm in the form of a helical member having a plurality of flights which are spaced apart a distance corresponding to the distance between the rows of cups, said flights being positioned so that an end of a flight engages the lip of the pan and prevents the pan from moving until the arm is rotated, and
    motor means for turning the arm so that it rotates through one 360° turn and then stops momentarily and then rotates again.

5. The indexing machine of claim 4 including means for removably coupling the arm to the motor means so that the arm may be replaced with another arm which has flights spaced differently from the arm removed.

6. In an apparatus for feeding bakery pans along a predetermined path in a step-wise fashion, said pans having rows of cups arranged in series with a lip member disposed about the perimeter of the pan and encompassing the cups,
    conveyor means on which the pans sit, with individual pans being lined up in a row with edges of the pans abutting each other,
    a generally horizontal shaft having mounted thereon a helical arm member which has individual flights spaced apart a distance corresponding to the distance between the rows of cups in the pan, said flights having edges adapted to engage the lip of the pan,
    means for removably connecting the shaft to motor means which rotate the shaft through a 360° turn and then momentarily stops for a time interval sufficient to allow the cups to have dough packets deposited therein within a predetermined row of cups.

7. The combination of claim 6 wherein the arm has a surface made of a plastic material which inhibits the binding between the surface of the flights and the lip of the pan.

8. Apparatus for manufacturing bakery products, including means for depositing individual dough packets into individual cups of a bakery pan having a raised lip extending about the perimeter of the pan, said dough packets being deposited into pans as the pans are advanced incrementally along a predetermined path, said pans being arranged in series and aligned so that adjacent pans abut each other, means for advancing the pans along said path, including indexing means comprising an arm in the form of a helical member having a flight with a span corresponding to the distance a pan is to be move after filling, said flights being positioned so that an edge of the flight engages the lip of the pan as it moves along said path, motor means for turning said arm so that it rotates and then stops momentarily, and means for removably coupling the arm to the motor means so that the arm may be disconnected and replaced with another arm which has flights spaced apart a distance that accommodates a different sized pan.

* * * * *